United States Patent
Li et al.

(10) Patent No.: US 12,495,407 B2
(45) Date of Patent: Dec. 9, 2025

(54) BEAM DETERMINATION METHOD AND DEVICE

(71) Applicant: DATANG MOBILE COMMUNICATIONS EQUIPMENT CO., LTD., Beijing (CN)

(72) Inventors: Hui Li, Beijing (CN); Runhua Chen, Beijing (CN); Qiubin Gao, Beijing (CN); Yajuan Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 394 days.

(21) Appl. No.: 18/017,412

(22) PCT Filed: Jul. 22, 2021

(86) PCT No.: PCT/CN2021/107997
§ 371 (c)(1),
(2) Date: Jan. 23, 2023

(87) PCT Pub. No.: WO2022/022396
PCT Pub. Date: Feb. 3, 2022

(65) Prior Publication Data
US 2023/0284196 A1 Sep. 7, 2023

(30) Foreign Application Priority Data
Jul. 27, 2020 (CN) .......................... 202010734328.1

(51) Int. Cl.
*H04W 72/04* (2023.01)
*H04W 52/42* (2009.01)
(Continued)

(52) U.S. Cl.
CPC ......... *H04W 72/046* (2013.01); *H04W 52/42* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2016/0191146 A1* | 6/2016 | Abouelenin | .......... H03F 1/0222 455/12.1 |
| 2017/0064641 A1 | 3/2017 | Logan et al. | |

(Continued)

FOREIGN PATENT DOCUMENTS

| | | |
|---|---|---|
| CN | 103036663 A | 4/2013 |
| CN | 108112075 A | 6/2018 |

(Continued)

OTHER PUBLICATIONS

Nokia et al.,"Correction on power backoff indication due to Power management", 3GPP TSG-RAN WG2 Meeting #104, Spokane, USA, Nov. 12-16, 2018, total 12 pages, R2-1818042.
(Continued)

*Primary Examiner* — Hashim S Bhatti
*Assistant Examiner* — Ahmed Saifuddin
(74) *Attorney, Agent, or Firm* — KILPATRICK TOWNSEND & STOCKTON LLP

(57) ABSTRACT

The embodiments of the present application relate to a beam determination method and device. When data is sent by means of the determined beam, loss of transmission performance is avoided. In the present application, a terminal sends reference information to a network side device according to configuration of the network side device, the reference information including power backoff information and/or reference signal received power, and the reference signal received power being obtained on the basis of the power backoff information; and the terminal receives a target beam indication sent by the network side device, and sends or receives a signal on the basis a target beam in the target beam indication, the target beam indication being deter-
(Continued)

mined by the network side device on the basis of the reference information.

16 Claims, 5 Drawing Sheets

(51) Int. Cl.
*H04W 72/044* (2023.01)
*H04W 72/23* (2023.01)

(56) References Cited

U.S. PATENT DOCUMENTS

| | | | |
|---|---|---|---|
| 2019/0249784 A1* | 8/2019 | Komatsuzaki | F16K 7/17 |
| 2019/0268061 A1* | 8/2019 | Li | H04B 17/17 |
| 2019/0297603 A1* | 9/2019 | Guo | H04L 5/0053 |
| 2019/0349784 A1 | 11/2019 | Tang et al. | |
| 2021/0119688 A1* | 4/2021 | Enescu | H04B 7/088 |
| 2022/0167335 A1* | 5/2022 | Go | H04W 52/146 |
| 2023/0144010 A1* | 5/2023 | Kwak | H04L 5/0051 370/329 |

FOREIGN PATENT DOCUMENTS

| | | |
|---|---|---|
| CN | 110149697 A | 8/2019 |
| CN | 110536397 A | 12/2019 |
| CN | 110838860 A | 2/2020 |
| CN | 110838862 A | 2/2020 |
| CN | 111386734 A | 7/2020 |
| WO | 2018210176 A1 | 11/2018 |
| WO | 2019193581 A2 | 10/2019 |
| WO | 2020101757 A1 | 5/2020 |

OTHER PUBLICATIONS

ZTE,"Enhancements on multi-beam operation", 3GPP TSG RAN WG1 Ad-Hoc Meeting #1901, Taipei, Jan. 21-25, 2019, total 18 pages, R1-1900088.

* cited by examiner

BEAM DETERMINATION METHOD AND DEVICE

CROSS REFERENCE TO RELATED APPLICATIONS

The present application is a National Stage of International Application No. PCT/CN2021/107997 filed Jul. 22, 2021, which claims priority to the Chinese patent application No. 202010734328.1 filed on Jul. 27, 2020 to the China Patent Office, and entitled "BEAM DETERMINATION METHOD AND DEVICE", the entire content of which is incorporated herein by reference.

FIELD

The present application relates to the field of wireless communications, in particular to a beam determination method and device.

BACKGROUND

In a new radio (NR) system, a base station sends downlink data to a user terminal through a downlink direction of a determined beam, and at the same time, the user terminal sends uplink data through an uplink direction of the above beam according to beam reciprocity.

In the related art, the base station sends channel state information reference signal (CSI-RS) resources to the user terminal, and the user terminal performs beam scanning on all the CSI-RS resources to obtain layer 1 reference signal received power (L1-RSRP) and sends a maximum value of L1-RSRP and a channel state information reference signal resource indicator (CRI) of corresponding CSI-RS resources to the base station. The base station may determine a beam corresponding to the received CRI as an optimal beam according to the received CRI, and at the same time, a terminal determines an uplink direction of the optimal beam according to beam reciprocity.

In order to avoid too high exposure of the terminal to human bodies, maximum permissible exposure (MPE) is specified in the NR system. When a beam direction faces a human body, uplink transmission power for emitting through this beam must be lowered to be within an allowed range of MPE. Accordingly, power backoff needs to be performed on uplink transmission in this direction, and if uplink data is sent through that beam when it is determined that the beam faces a human body through the above solution, loss of transmission performance will be caused.

SUMMARY

The present application provides a beam determination method and device. When data is sent by means of a determined beam, loss of transmission performance is avoided.

In one embodiment of the present application provides a beam determination method, including: sending, by a terminal, reference information to a network side device according to configuration of the network side device, the reference information including power backoff information and/or reference signal received power, and the reference signal received power being obtained on the basis of the power backoff information; and receiving, by the terminal, a target beam indication sent by the network side device, and sending or receiving, by the terminal, a signal on the basis of a target beam in the target beam indication, the target beam indication being determined by the network side device on the basis of the reference information.

In the above method, the target beam is obtained on the basis of the reference information, the reference information is the power backoff information and/or the reference signal received power obtained according to the power backoff information, and thus determination of the target beam considers the influence of the power backoff information, a beam with good uplink transmission performance can be determined, and the terminal sends uplink data through the beam, and loss of transmission performance can be avoided.

In one embodiment, the configuration of the network side device includes panel configuration information sent by the network side device, and before the terminal sends the reference information to the network side device, the method further includes: determining, by the terminal, a manner of receiving CSI-RS resources and/or a panel for receiving the CSI-RS resources on the basis of the panel configuration information; or, sending, by the terminal, a quantity of panels of the terminal and/or panel identification information to the network side device.

In the above method, the terminal can determine the manner of receiving the CSI-RS resources and the panel for receiving the CSI-RS resources according to the panel configuration information, thus the requirements of adopting different manners of receiving the CSI-RS resources and adopting different receiving panels to receive the CSI-RS resources are met, the CSI-RS resources are received more flexibly, and then the L1-RSRP, the power backoff information and the CRI corresponding to each CSI-RS resource are determined.

In one embodiment, in a case that the reference information includes the power backoff information, the sent power backoff information includes: a power backoff value corresponding to each L1-RSRP or each CRI sent by the terminal to the network side device; or, the sent power backoff information includes: a non-zero power backoff value in a power backoff value corresponding to each L1-RSRP or each CRI sent by the terminal to the network side device; or, the sent power backoff information includes: a power backoff value of each panel of the terminal.

In the above method, the power backoff information sent by the terminal may be the power backoff value corresponding to each L1-RSRP or each CRI sent by the terminal to the network side device, or the non-zero power backoff value in the corresponding power backoff value, and thus different power backoff information can be sent flexibly according to different application scenarios.

In one embodiment, the power backoff information is determined on the basis of MPE and/or a maximum sending power of the terminal.

In one embodiment, in a case that the reference information includes the reference signal received power, the configuration of the network side device includes: signaling indicating the terminal to report the reference signal received power sent by the network side device.

In one embodiment, the terminal determines the reference signal received power through a following manner: the terminal adjusting the corresponding L1-RSRP on the basis of the power backoff information to obtain the reference signal received power.

In one embodiment, the panel configuration information includes at least one of following information: a panel identifier, a quantity of panels or whether a single panel is adopted.

In one embodiment of the present application provides a beam determination method, including: determining, by a terminal, a manner of sending sounding reference signal (SRS) resources and/or a panel for sending the SRS resources according to panel configuration information sent by a network side device; sending, by the terminal, the SRS resources to the network side device through a sending power obtained according to power backoff on the basis of the determined sending manner and/or panel; and receiving, by the terminal, a target beam indication sent by the network side device, and sending or receiving, by the terminal, a signal on the basis of a target beam in the target beam indication, the target beam indication being determined by the network side device on the basis of a received power for receiving the respective SRS resources.

In the above method, the terminal can determine the manner of sending the SRS resources and/or the panel for sending the SRS resources through the panel configuration information, and then the SRS resources can be sent to the network side device through the sending power obtained according to power backoff by adopting the determined manner and/or panel, that is, the sent SRS resources consider the influence of power backoff, and the network side device determines the target beam under the influence of power backoff according to the received power for receiving the respective SRS resources, the terminal sends uplink data through the target beam, and loss of transmission performance can be avoided.

In one embodiment, the panel configuration information includes at least one of following information: a panel identifier, a quantity of panels, whether a single panel is adopted or at least one SRS resource set.

In one embodiment, each SRS resource set is associated with one panel of the terminal.

In one embodiment of the present application provides a beam determination method, including: configuring, by a network side device, a terminal to send reference information, and determining, by the network side device, a target beam indication on the basis of the received reference information sent by the terminal, the reference information including power backoff information and/or a reference signal received power, and the reference signal received power being obtained on the basis of the power backoff information; and sending, by the network side device, the target beam indication to the terminal to cause the terminal to send or receive a signal on the basis of a target beam in the target beam indication.

In the above method, the network side device obtains the target beam on the basis of the reference information, the reference information is the power backoff information and/or the reference signal received power obtained according to the power backoff information, and thus the obtained target beam considers the influence of the power backoff information, a beam with good uplink transmission performance can be determined, and uplink data is sent through the beam, and loss of uplink transmission performance can be avoided.

In one embodiment, the configuring, by a network side device, a terminal to send reference information includes: sending, by the network side device, panel configuration information to the terminal to cause the terminal to determine a manner of receiving CSI-RS resources and/or a panel for receiving the CSI-RS resources on the basis of the panel configuration information; or configuring, by the network side device, the terminal to send a quantity of panels of the terminal and/or panel identification information.

In the above method, the network side device sends the panel configuration information to the terminal, the terminal can determine the manner of receiving the CSI-RS resources and the panel for receiving the CSI-RS resources according to the panel configuration information, thus the requirements of adopting different manners of receiving the CSI-RS resources and adopting different receiving panels to receive the CSI-RS resources are met, and the CSI-RS resources are received more flexibly.

In one embodiment, in a case that the reference information includes the power backoff information, the sent power backoff information includes: a power backoff value corresponding to each L1-RSRP or each CRI sent by the terminal to the network side device; or, the sent power backoff information includes: a non-zero power backoff value in a power backoff value corresponding to each L1-RSRP or each CRI sent by the terminal to the network side device; or, the sent power backoff information includes: a power backoff value of each panel of the terminal.

In the above method, the sent power backoff information may be the power backoff value corresponding to each L1-RSRP or each CRI sent by the terminal to the network side device, or the non-zero power backoff value in the corresponding power backoff value, and thus different sent power backoff information can be determined flexibly according to different application scenarios.

In one embodiment, the power backoff information is determined on the basis of MPE and/or a maximum sending power of the terminal.

In one embodiment, in a case that the reference information includes the reference signal received power, the configuring, by a network side device, a terminal to send reference information includes: signaling indicating the terminal to report the reference signal received power sent by the network side device to the terminal.

In one embodiment, the reference signal received power is obtained by adjusting the L1-RSRP by the terminal on the basis of the power backoff information.

In one embodiment, the panel configuration information includes at least one of following information: a panel identifier, a quantity of panels or whether a single panel is adopted.

In one embodiment of the present application provides a beam determination method, including: sending, by a network side device, panel configuration information to a terminal to cause the terminal to send SRS resources through sending power obtained according to power backoff on the basis of a manner of sending the SRS resources and/or a panel for sending the SRS resources in the panel configuration information; and determining, by the network side device, a target beam indication according to received power of all the SRS resources, and sending, by the network side device, the target beam indication to the terminal to cause the terminal to send or receive a signal on the basis of a target beam in the target beam indication.

In one embodiment, the panel configuration information includes at least one of following information: a panel identifier, a quantity of panels, whether a single panel is adopted or at least one SRS resource set.

In one embodiment, each SRS resource set is associated with one panel of the terminal.

In one embodiment of the present application provides a terminal, including: a processor, a memory and a transceiver; and the processor is configured to read a program in the memory and execute a following process: sending reference information to a network side device according to configuration of the network side device, the reference information including power backoff information and/or reference signal received power, and the reference signal received power being obtained on the basis of the power backoff information; and receiving a target beam indication sent by the network side device, and sending or receiving a signal on the basis of a target beam in the target beam indication, the target beam indication being determined by the network side device on the basis of the reference information.

In one embodiment, the configuration of the network side device includes panel configuration information sent by the network side device; and the processor is further configured to: before the reference information is sent to the network side device, determine a manner of receiving CSI-RS resources and/or a panel for receiving the CSI-RS resources on the basis of the panel configuration information; or, the processor is further configured to: before the reference information is sent to the network side device, send a quantity of panels of the terminal and/or panel identification information to the network side device.

In one embodiment, in a case that the reference information includes the power backoff information, the sent power backoff information includes: a power backoff value corresponding to each L1-RSRP or each CRI sent by the terminal to the network side device; or, the sent power backoff information includes: a non-zero power backoff value in a power backoff value corresponding to each L1-RSRP or each CRI sent by the terminal to the network side device; or, the sent power backoff information includes: a power backoff value of each panel of the terminal.

In one embodiment, the power backoff information is determined on the basis of maximum permissible exposure MPE and/or maximum sending power of the terminal.

In one embodiment, in a case that the reference information includes the reference signal received power, the configuration of the network side device includes: signaling indicating the terminal to report the reference signal received power sent by the network side device.

In one embodiment, the processor may be configured to: adjust, by the terminal, the corresponding L1-RSRP on the basis of the power backoff information to obtain the reference signal received power.

In one embodiment, the panel configuration information includes at least one of following information: a panel identifier, a quantity of panels or whether a single panel is adopted.

In one embodiment of the present application provides another terminal, including: a processor, a memory and a transceiver; and the processor is configured to read a program in the memory and execute a following process: determining a manner of sending SRS resources and/or a panel for sending the SRS resources according to panel configuration information sent by a network side device; sending the SRS resources to the network side device through sending power obtained according to power backoff on the basis of the determined sending manner and/or panel; and receiving a target beam indication sent by the network side device, and sending or receiving a signal on the basis of a target beam in the target beam indication, the target beam indication being determined by the network side device on the basis of received power for receiving all the SRS resources.

In one embodiment, the panel configuration information includes at least one of following information: a panel identifier, a quantity of panels, whether a single panel is adopted or at least one SRS resource set.

In a possible implementation, each SRS resource set is associated with one panel of the terminal.

In one embodiment of the present application provides a network side device, including: a processor, a memory and a transceiver; and the processor is configured to read a program in the memory and execute a following process: configuring a terminal to send reference information, and determining a target beam indication on the basis of the received reference information sent by the terminal, the reference information including power backoff information and/or reference signal received power, and the reference signal received power being obtained on the basis of the power backoff information; and sending the target beam indication to the terminal to cause the terminal to send or receive a signal on the basis of a target beam in the target beam indication.

In on embodiment, the processor may be configured to: send panel configuration information to the terminal to cause the terminal to determine a manner of receiving CSI-RS resources and/or a panel for receiving the CSI-RS resources on the basis of the panel configuration information, or, configure the terminal to send a quantity of panels of the terminal and/or panel identification information.

In one embodiment, in a case that the reference information includes the power backoff information, the sent power backoff information includes: a power backoff value corresponding to each L1-RSRP or each CRI sent by the terminal to the network side device, or, the sent power backoff information includes: a non-zero power backoff value in a power backoff value corresponding to each L1-RSRP or each CRI sent by the terminal to the network side device, or, the sent power backoff information includes: a power backoff value of each panel of the terminal.

In one embodiment, the power backoff information is determined on the basis of MPE and/or maximum sending power of the terminal.

In one embodiment, in a case that the reference information includes the reference signal received power, the processor may be configured to: send signaling indicating the terminal to report the reference signal received power to the terminal.

In one embodiment, the reference signal received power is obtained by adjusting the L1-RSRP by the terminal on the basis of the power backoff information.

In a possible implementation, the panel configuration information includes at least one of following information: a panel identifier, a quantity of panels or whether a single panel is adopted.

In one embodiment of the present application provides another network side device, including: a processor, a memory and a transceiver; and the processor is configured to read a program in the memory and execute a following process: sending panel configuration information to a terminal to cause the terminal to send SRS resources through sending power obtained according to power backoff on the basis of a manner of sending the SRS resources and/or a panel for sending the SRS resources in the panel configuration information; and determining a target beam indication according to received power of all the SRS resources, and sending the target beam indication to the terminal to cause the terminal to send or receive a signal on the basis of a target beam in the target beam indication.

In one embodiment, the panel configuration information includes at least one of following information: a panel identifier, a quantity of panels, whether a single panel is adopted or at least one SRS resource set.

In one embodiment, each SRS resource set is associated with one panel of the terminal.

In one embodiment of the present application provides a beam determination apparatus, including: a first sending device: configured to send reference information to a network side device according to configuration of the network side device, the reference information including power backoff information and/or reference signal received power, and the reference signal received power being obtained on the basis of the power backoff information; and a first receiving device: configured to receive a target beam indication sent by the network side device, and send or receive a signal on the basis of a target beam in the target beam indication, the target beam indication being determined by the network side device on the basis of the reference information.

In one embodiment of the present application provides a beam determination apparatus, including: a second determining device: configured to determine a manner of sending SRS resources and/or a panel for sending the SRS resources according to panel configuration information sent by a network side device; a second sending device: configured to send the SRS resources to the network side device through sending power obtained according to power backoff on the basis of the determined sending manner and/or panel; and a second receiving device: configured to receive a target beam indication sent by the network side device, and send or receive a signal on the basis of a target beam in the target beam indication, the target beam indication being determined by the network side device on the basis of received power for receiving all the SRS resources.

In one embodiment of the present application provides a beam determination apparatus, including: a third sending device, configured to configure a terminal to send reference information; a third determining device, configured to determine a target beam indication on the basis of the received reference information sent by the terminal, the reference information including power backoff information and/or reference signal received power, and the reference signal received power being obtained on the basis of the power backoff information; and the third sending device, further configured to send the target beam indication to the terminal to cause the terminal to send or receive a signal on the basis of a target beam.

In one embodiment of the present application provides a beam determination apparatus, including: a fourth sending device, configured to send panel configuration information to a terminal to cause the terminal to send SRS resources through sending power obtained according to power backoff on the basis of a manner of sending the SRS resources and/or a panel for sending the SRS resources in the panel configuration information; a fourth determining device, configured to determine a target beam indication according to received power of all the SRS resources; and the fourth sending device, further configured to send the target beam indication to the terminal to cause the terminal to send or receive a signal on the basis of a target beam in the target beam indication.

In one embodiment the present application provides a computer storage medium, storing a computer program thereon, and the program, when executed by a processor, implements embodiments of the application.

In addition, the effects brought by any embodiments may refer to the effects brought by different implementations in the first aspect to the fourth aspect correspondingly, which are not repeated here.

BRIEF DESCRIPTION OF THE DRAWINGS

In order to explain the embodiments of the present application more clearly, the following will briefly introduce the drawings that need to be used in the description of the embodiments.

DETAILED DESCRIPTION OF THE EMBODIMENTS

Figure 1:
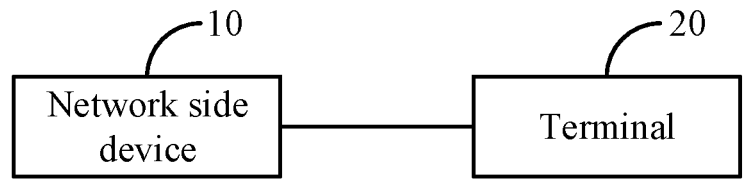
FIG. 1 is a structural diagram of a beam determination system provided by an embodiment of the present application.

Part of terms in embodiments of the present application are explained below.
(1) In the embodiments of the present application, nouns "network" and "system" are often alternately used.
(2) The term "a plurality of" in the embodiments of the present application means two or more, and other quantifiers are similar to it.
(3) "And/or" describes the association relationship of associated objects, which means that there can be three kinds of relationships, for example, A and/or B can mean that there are three kinds of situations: A alone, A and B at the same time, and B alone. The character "/" universally indicates that front and back associated objects are in an "or" relationship.
(4) In the embodiment of the present application, the terminal is a device having a wireless communication function, may be deployed on the land, including being deployed indoors or outdoors, and being handheld or vehicle-mounted, may also be deployed on water surfaces (e.g., ships), and may be further deployed in the air (e.g., airplanes, balloons and satellites). The terminal may be a mobile phone, a pad, a computer with a wireless receiving and sending function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home and the like. The terminal may also be various forms of UE, mobile stations (MS) and terminal devices.
(5) In the embodiment of the present application, a network side device may be a base station, and is a device providing a wireless communication function for a terminal, including but not limited to: a gNB in 5G, a radio network controller (RNC), a node B (NB), a base station controller (BSC), a base transceiver station (BTS), a home base station (e.g., a home evolved node B or a home node B (HNB)), a baseband unit (BBU), a transmitting and receiving point (TRP), a transmitting point (TP), a mobile switching center and the like. The base station in the present application may further be a device providing the wireless communication function for the terminal in other communication systems that may appear in the future.

In an NR system, a base station sends downlink data to a user terminal through a downlink direction of a determined beam, and at the same time, the user terminal sends uplink data through an uplink direction of the above beam according to beam reciprocity. The base station sends CSI-RS resources to the user terminal, and the user terminal performs beam scanning on the CSI-RS resources to obtain L1-RSRP and sends a maximum value of L1-RSRP and a CRI of the corresponding CSI-RS resources to the base station. The base station may determine a beam corresponding to the received CRI as an optimal beam according to the received CRI, and at the same time, a terminal determines an uplink direction of the optimal beam according to beam reciprocity.

However, in order to avoid too high exposure to human bodies from the terminal, MPE is specified in the NR system, and when a beam direction faces a human body, uplink transmission power for emitting through this beam must be lowered to be within an allowed range of the MPE. Accordingly, power backoff needs to be performed on uplink transmission in this direction, and if uplink data is sent through that beam when it is determined that the beam faces a human body through the above solution, loss of transmission performance will be caused.

In order to solve the above problems, the embodiments of the present application provide a beam determination method and device. A target beam is determined on the basis of reference information, the reference information is power backoff information and/or reference signal received power obtained according to the power backoff information, thus determination of the target beam considers the influence of the power backoff information, a beam with good uplink transmission performance can be determined, and a terminal sends uplink data through the beam, and loss of transmission performance can be avoided.

Embodiments of the present application are made more clearer, the present application will be further described in detail in combination with the attached drawings below. Apparently, the described embodiments are only part of the embodiments of the present application, not all of them.

As shown in FIG. 1, it is a structural diagram of a beam determination system provided by an embodiment of the present application. The system includes a network side device 10 and a terminal 20.

In some embodiments, the network side device 10 is configured to configure the terminal 20 to send reference information, and determine a target beam indication on the basis of the received reference information sent by the terminal 20, the reference information including power backoff information and/or reference signal received power, and the reference signal received power being obtained on the basis of the power backoff information. The network side device 10 is further configured to send the target beam indication to the terminal 20 to cause the terminal 20 to send or receive a signal on the basis of a target beam in the target beam indication.

The terminal 20 is configured to send the reference information to the network side device 10 according to configuration of the network side device 10, the reference information including the power backoff information and/or the reference signal received power, and the reference signal received power being obtained on the basis of the power backoff information; and the terminal 20 is further configured to receive the target beam indication sent by the network side device 10, and send or receive a signal on the basis of the target beam in the target beam indication, the target beam indication being determined by the network side device 10 on the basis of the reference information.

In the embodiments, the terminal sends the reference information corresponding to the configuration of the network side device to the network side device according to the configuration. There may be many pieces of the sent reference information, including but not limited to: at least one piece of power backoff information, at least one piece of reference signal received power, or both the power backoff information and the reference signal received power at the same time.

In addition, a quantity of the sent reference information is not limited by the embodiment, and may be selected according to actual application scenarios.

In the above embodiments, the target beam is obtained on the basis of the reference information, the reference information is the power backoff information and/or the reference signal received power obtained according to the power backoff information, thus determination of the target beam considers the influence of the power backoff information, a beam with good uplink transmission performance can be determined, and the terminal sends uplink data through the beam, and loss of transmission performance can be avoided.

In some embodiments, the network side device sends panel configuration information to the terminal, and the terminal determines a manner of receiving CSI-RS resources and/or a panel for receiving the CSI-RS resources on the basis of the panel configuration information; or the terminal sends a quantity of panels of the terminal and/or panel identification information to the network side device.

In the embodiments, the terminal may have one or more panels, and according to the above panel configuration information, the terminal is able to determine whether all the panels are adopted for receiving the CSI-RS resources, which panels are adopted for receiving the CSI-RS resources and such information.

The terminal sends a quantity of the panels of the terminal and/or the panel identification information to the network side device. The network side device is able to obtain information related to the panels of the terminal. In some embodiments, the panel configuration information includes at least one of following information: a panel identifier, a quantity of panels or whether a single panel is adopted.

According to the panel identifier in the panel configuration information, the terminal may determine which panels are adopted for receiving the CSI-RS resources; according to the quantity of the panels, the terminal may determine how many panels are adopted for receiving the CSI-RS resources; and according to whether a single panel is adopted, the terminal may determine the manner of receiving the CSI-RS resources. For example:

1) there are four panels in the terminal: panel1, panel2, panel3 and panel4, the panel configuration information includes: the panel identifiers being panel1 and panel2, not a single panel is adopted, and the terminal determines that only panel1 and panel2 in the four panels are adopted for receiving the CSI-RS resources, instead of adopting a single panel on the basis of the panel configuration information;

2) There are four panels in the terminal: panel1, panel2, panel3 and panel4, the panel configuration information includes: the panel identifier being panel1, a single panel is adopted, and the terminal determines that only panel1 in the four panels is adopted for receiving the CSI-RS resources, and a manner of a single panel is adopted on the basis of the panel configuration information;

3) There are four panels in the terminal: panel1, panel2, panel3 and panel4, the panel configuration information includes: the panel identifiers being panel1, panel2, panel3 and panel4, not a single panel is adopted, and the terminal determines that all the panels are adopted for receiving the CSI-RS resources, instead of adopting a single panel on the basis of the panel configuration information.

It can be understood that the above panel configuration information may further contain other information related to the panels, which is not given with an example for description herein.

In the above method, the terminal can determine the manner of receiving the CSI-RS resources and the panel for receiving the CSI-RS resources according to the panel configuration information, and thus the requirements of adopting different manners of receiving the CSI-RS resources and adopting different receiving panels to receive the CSI-RS resources are met, the CSI-RS resources are received more flexibly, and then the L1-RSRP, the power backoff information and the CRI corresponding to each CSI-RS resource are determined.

In some embodiments, if the above reference information includes the power backoff information, the sent power backoff information may be a power backoff value corresponding to each L1-RSRP or each CRI sent by the terminal to the network side device, or a non-zero power backoff value in the power backoff value corresponding to each L1-RSRP or each CRI sent by the terminal to the network side device.

Exemplarily, the terminal detects each of the received CSI-RS resources to obtain the corresponding L1-RSRP and determines whether to send the L1-RSRP, and if it is determined to send the L1-RSRP, the L1-RSRP as well as the power backoff information and CRI of the corresponding CSI-RS resource are sent to the network side device; or, whether the backoff information is zero or not is determined before sending, if it is zero, only the L1-RSRP and the CRI are sent, and if it is not zero, the L1-RSRP, the backoff information and the CRI are sent.

In the above method, the power backoff information sent by the terminal may be the power backoff value corresponding to each L1-RSRP or each CRI sent by the terminal to the network side device, or the non-zero power backoff value in the corresponding power backoff value, and thus different power backoff information can be sent flexibly according to different application scenarios.

The sent L1-RSRP is not limited by the embodiment, for example:

1) maximum L1-RSRP obtained via measurement by each panel is selected to be sent;

2) L1-RSRP greater than a first preset threshold value is selected to be sent, and a specific value of the first preset threshold value may be set according to actual application scenarios; and 3) first N L1-RSRP in an order of large to small is selected to be sent, and N is a positive integer, of which a specific value may also be set according to actual application scenarios.

The above sent L1-RSRP is only an example for illustration, and is not regarded as limitation to the embodiment.

In some embodiments, the power backoff information is determined on the basis of MPE and/or maximum sending power of the terminal.

Exemplarily, whether a corresponding beam for receiving the CSI-RS resource faces a human body is determined through a sensor, if the beam does not face a human body, the power backoff value corresponding to the CSI-RS resource is zero; and if the beam faces a human body, whether sending power is greater than the maximum sending power of the terminal needs to be further determined, if it is not greater than the maximum sending power, the power backoff value corresponding to the CSI-RS resource is zero, and if it is greater than the maximum sending power, the power backoff value corresponding to the CSI-RS resource is not zero. The corresponding sending power may be calculated through a path loss. In addition, a specific power backoff value may be obtained from a difference between the above maximum sending power and the above sending power, for example:

1) the power backoff value $Pb=P0-Pmax$, where $P0$ is the above sending power, and $Pmax$ is the above maximum sending power; and 2) the power backoff value $Pb=(P0-Pmax)/delta$, where delta denotes a scale factor corresponding to the path loss when the sending power is calculated.

The above maximum sending power may be determined according to requirements of MPE.

In some embodiments, if the reference information includes the reference signal received power, the configuration of the network side device includes: signaling indicating the terminal to report the reference signal received power sent by the network side device.

In one embodiment, the terminal adjusts the corresponding L1-RSRP on the basis of the power backoff information to obtain the reference signal received power.

Exemplarily, the terminal detects each of the received CSI-RS resources to obtain corresponding L1-RSRP, determines the power backoff information through the manner in the above embodiment, and then adjusts the corresponding L1-RSRP according to the power backoff information to obtain the reference signal received power, from which sent reference signal received power is selected.

The sent reference signal received power is not limited by the embodiment, for example:

1) reference signal received power greater than a second preset threshold value is selected, and a specific value of the second preset threshold value may be set according to actual application scenarios; and 2) first M reference signal received power in an order of large to small is selected, and M is a positive integer, of which a specific value may also be set according to actual application scenarios.

The above sent reference signal received power is only an example for illustration, and is not regarded as limitation to the embodiment.

In some embodiments, the above reference information only includes the power backoff information, and the network side device determines the reference signal received power according to the received power backoff information and corresponding L1-RSRP, and selects a beam for sending the CSI-RS resource corresponding to maximum reference signal received power in the determined reference signal received power as a target beam.

In some other embodiments, the above reference information only includes the reference signal received power, and the network side device determines a beam for sending the CSI-RS resource corresponding to maximum reference signal received power in the received reference signal received power as a target beam.

In yet some embodiments, the above reference information includes the power backoff information and the reference signal received power at the same time, and the network side device determines the reference signal received power first according to the received power backoff information and corresponding L1-RSRP, and uses a beam for sending the CSI-RS resource corresponding to maximum reference signal received power in the determined reference signal received power and the received reference signal received power as a target beam.

Through following embodiments, the present application describes how to determine the target beam by the network side device and the terminal.

Embodiment 1, the network side device configures S=8 CSI-RS resources (denoted as CSI-RS resources 0-7 respectively) for the terminal for performing scanning of a sending beam, and configures the terminal to report a CRI, L1-RSRP and a power backoff value. It is assumed that the terminal has 2 panels, denoted as panel #0 and panel #1 respectively. Panel #0 conducts receiving by using a receiving beam 0, and panel #1 conducts receiving by using a receiving beam 1. The network side device configures the terminal to report a CSI-RS resource with maximum RSRP obtained via measurement by each panel respectively.

After RSRP measurement is performed by the two panels on the 8 CSI-RS resources respectively, the terminal determines maximum RSRP received by panel #0 as RSRP of the CSI-RS resource 1, denoted as RSRP0, and a corresponding CRI is recorded as CRI_1; and maximum RSRP received by panel #1 is RSRP of the CSI-RS resource 3, denoted as RSRP1, and a corresponding CRI is recorded as CRI_3. At the same time, the terminal determines that panel #0 faces a human body according to the sensor, while panel #1 does not face a human body. Accordingly, whether a sent signal of panel #0 needs power backoff needs to be determined. The terminal may obtain a corresponding path loss value through RSRP0 and RSRP1. Afterwards, values of corresponding sending power are calculated according to the calculated path loss value, denoted as P0 and P1 respectively. According to requirements of MPE, maximum sending power Pmax of the terminal is determined. If P0<Pmax, it does not exceed the maximum sending power, there is no need to perform power backoff, and the power backoff value at the moment is 0; and if P0>Pmax, it exceeds the maximum sending power, and power backoff needs to be performed to guarantee that sending power after backoff is not greater than Pmax. A type of calculation of the power backoff value may be determined according to a method for calculating sending power of an uplink signal or channel in NR. For example, the power backoff value Pb may be calculated as:

$$Pb = P0 - Pmax; \text{ or}$$

$$Pb = (P0 - Pmax)/\text{delta},$$

where delta denotes a scale factor corresponding to the path loss when the sending power is calculated.

Thus, according to the above calculation, information reported by the terminal is as shown in Table 1.

TABLE 1

| Information reported by terminal | | | | | |
|---|---|---|---|---|---|
| CRI of panel#0 | L1-RSRP of panel#0 | Power backoff value of panel#0 | CRI of panel#1 | L1-RSRP of panel#1 | Power backoff value of panel#1 |
| CRI_1 | RSRP0 | Pb0 = P0 − Pmax | CRI_3 | RSRP1 | Pb1 = 0 |

The network side device determines an uplink panel and an uplink beam according to the information reported by the terminal. One determination method is comparing values of RSRP0-Pb0 and RSRP1-Pb1, for example: if the value of RSRP1-Pb1 is larger, the network side device determines to use the receiving beam 1 of panel #1 as a sending beam for an uplink channel or an uplink reference signal, and sends an indication of the beam to the terminal, and the terminal performs subsequent transmission through the beam on the basis of the indication.

Embodiment 2, the network side device configures S=8 CSI-RS resources for the terminal for performing scanning of a sending beam, and configures the terminal to report four groups of CRIs, L1-RSRP and power backoff values.

It is assumed that the terminal has 2 panels, denoted as panel #0 and panel #1 respectively. Panel #0 conducts receiving by using a receiving beam 0, and panel #1 conducts receiving by using a receiving beam 1. After RSRP measurement is performed by the two panels on the 8 CSI-RS resources respectively, according to the order of values of RSRP, 4 maximum RSRP is respectively:

the CSI-RS resource 1 received by panel #0, the corresponding CRI being recorded as CRI_1;

the CSI-RS resource 5 received by panel #0, the corresponding CRI being recorded as CRI_5;

the CSI-RS resource 3 received by panel #1, the corresponding CRI being recorded as CRI_3; and the CSI-RS resource 6 received by panel #0, the corresponding CRI being recorded as CRI_6.

The terminal determines the power backoff values corresponding to the 4 RSRP respectively, and a manner of determining the power backoff values is the same as that in embodiment 1, which is not repeated here. Thus, according to the above calculation, information reported by the terminal is as shown in Table 2. A method for determining an uplink beam by the network side device subsequently is the same as that in embodiment 1, which is not repeated here.

TABLE 2

| | CRI | L1-RSRP | Power backoff value |
|---|---|---|---|
| | \multicolumn{3}{c}{Information reported by terminal} | |
| Group 1 | CRI_1 | RSRP0 | Pb0 |
| Group 2 | CRI_5 | RSRP1 | Pb1 |
| Group 3 | CRI_3 | RSRP2 | Pb2 |
| Group 4 | CRI_6 | RSRP3 | Pb3 |

Embodiment 3, a base station configures S=8 CSI-RS resources (denoted as CSI-RS resources 0-7 respectively) for the terminal for performing scanning of a sending beam, and configures the terminal to report a CRI and reference signal received power (recorded as MPE-RSRP). It is assumed that the terminal has 2 panels, denoted as panel #0 and panel #1 respectively. Panel #0 conducts receiving by using a receiving beam 0, and panel #1 conducts receiving by using a receiving beam 1. The base station configures the terminal to report a CSI-RS resource with maximum MPE-RSRP obtained via measurement by each panel respectively.

After L1-RSRP measurement is performed by the two panels on the 8 CSI-RS resources respectively, the terminal determines whether power backoff is performed for a measurement result of each L1-RSRP and determines a power backoff value. The terminal determines that panel #0 faces a human body according to the sensor, while panel #1 does not face a human body. Accordingly, panel #1 does not need power backoff, and the value of L1-RSRP measured by panel #1 is a value of MPE-RSRP. It is assumed that L1-RSRP of the CSI-RS resource 5 measured by panel #1 is the maximum, denoted as L1-RSRP1,5, and the corresponding CRI is recorded as CRI_5. Whether power backoff is performed needs to be determined for L1-RSRP of each CSI-RS resource measured by panel #0. A method for determining power backoff is the same as that in embodiment 1, which is not repeated here. The 8 L1-RSRP measured by panel #0 is denoted as $L1\text{-}RSRP_{0,0}$, $L1\text{-}RSRP_{0,1}$, ..., and $L1\text{-}RSRP_{0,7}$ respectively, and the power backoff values corresponding to each of the CSI-RS resources are denoted as Pb0, Pb1, ..., and Pb7 correspondingly. The terminal calculates the MPE-RSRP corresponding to each CSI-RS resource, denoted as MPE-RSRP0, MPE-RSRP1, ..., and MPE-RSRP7. $MPE\text{-}RSRP_i = L1\text{-}RSRP_{0,i} - Pbi$, $i=0, 1, \ldots,$ and 7. It is assumed that a value of MPE-RSRP3 is the maximum, and a corresponding CRI is recorded as CRI_3. The terminal selects and reports MPE-RSRP with the maximum value in each panel, and in this way, information reported by the terminal is as shown in Table 3.

TABLE 3

| | | | |
|---|---|---|---|
| \multicolumn{4}{c}{Information reported by terminal} | | | |
| CRI of panel#0 | MPE-RSRP of panel#0 | CRI of panel#1 | MPE-RSRP of panel#1 |
| CRI_3 | MPE-RSRP3 | CRI_5 | $L1\text{-}RSRP_{1,5}$ |

The network side device determines an uplink panel and an uplink beam according to the information reported by the terminal. One determination method is comparing values of MPE-RSRP3 and $L1\text{-}RSRP_{1,5}$, for example: if the value of MPE-RSRP3 is larger, the base station determines to use the receiving beam 0 of panel #0 as a sending beam for an uplink channel or an uplink reference signal and sends an indication of the beam to the terminal, and the terminal performs subsequent transmission through the beam on the basis of the indication; and if the value of $L1\text{-}RSRP_{1,5}$ is larger, the base station determines to use the receiving beam 1 of panel #1 as a sending beam for an uplink channel or an uplink reference signal and sends an indication of the beam to the terminal, and the terminal performs subsequent transmission through the beam on the basis of the indication. In some other embodiments, the network side device 10 is configured to send the panel configuration information to the terminal 20.

The terminal 20 is configured to send SRS resources through the sending power obtained according to power backoff on the basis of a manner of sending the SRS resources and/or a panel for sending the SRS resources in the panel configuration information; and the terminal 20 is further configured to send the SRS resources to the network side device 10 through the sending power obtained according to power backoff on the basis of the determined sending manner and/or panel.

The network side device 10 is further configured to determine a target beam indication according to received power of all the SRS resources, and send the target beam indication to the terminal 20 to cause the terminal 20 to send or receive a signal on the basis of a target beam in the target beam indication.

In the embodiments, the terminal may have one or more panels, and according to the above panel configuration information, the terminal is able to determine whether all the panels are adopted for sending the SRS resources, which panels are adopted for sending the SRS resources and such information.

In the above method, the terminal can determine the manner of sending the SRS resources and/or the panel for sending the SRS resources through the panel configuration information, and then the SRS resources can be sent to the network side device through the sending power obtained according to power backoff by adopting the determined manner and/or panel, that is, the sent SRS resources consider the influence of power backoff, and the network side device determines the target beam under the influence of power backoff according to the received power for receiving all the SRS resources, the terminal sends uplink data through the target beam, and loss of transmission performance can be avoided.

In some specific embodiments, the panel configuration information includes at least one of following information: a panel identifier, a quantity of panels, whether a single panel is adopted or at least one SRS resource set.

According to the panel identifier in the panel configuration information, the terminal may determine which panels are adopted for sending the SRS resources; according to a quantity of the panels, the terminal may determine how may panels are adopted for sending the SRS resources; according to whether a single panel is adopted, the terminal may determine the manner of sending the SRS resources; and according to the SRS resource sets, the terminal may allocate a mapping relation between the SRS resource sets and the panels by itself.

It can be understood that the above panel configuration information may further contain other information related to the panels, which is not given with an example for description herein.

In some embodiments, each SRS resource set is associated with one panel of the terminal.

Through following embodiments, the present application describes how to determine the target beam by the network side device and the terminal.

Embodiment 4, the network side device configures the terminal to transmit an SRS for performing uplink beam scanning. At the same time, the system predefines 1-bit signaling information to indicate that the terminal adopts a single panel for sending the SRS or all the panels for sending the SRS. It is assumed that the network side device configures the terminal to send S=8 SRS resources and indicates that the terminal adopts all the panels for sending at the same time. It is assumed that the terminal has M=4 panels, and then the terminal may allocate a mapping relation between the 8 SRS resources and the 4 panels by itself. For example: SRS0 and SRS1 are sent by panel-0, SRS2 and SRS3 are sent by panel-1, SRS4 and SRS5 are sent by panel-2, and SRS6 and SRS7 are sent by panel-3. When SRS sending power is calculated, the terminal will determine whether each panel faces a human body and thus requiring power backoff. Each SRS resource is transmitted by using sending power which is obtained after considering power backoff.

The network side device measures each of the received SRS resources, selects the SRS resource with maximum received power in the received SRS resources, and uses a direction of this SRS resource as a beam direction for transmitting a physical uplink shared channel subsequently.

Figure 2:
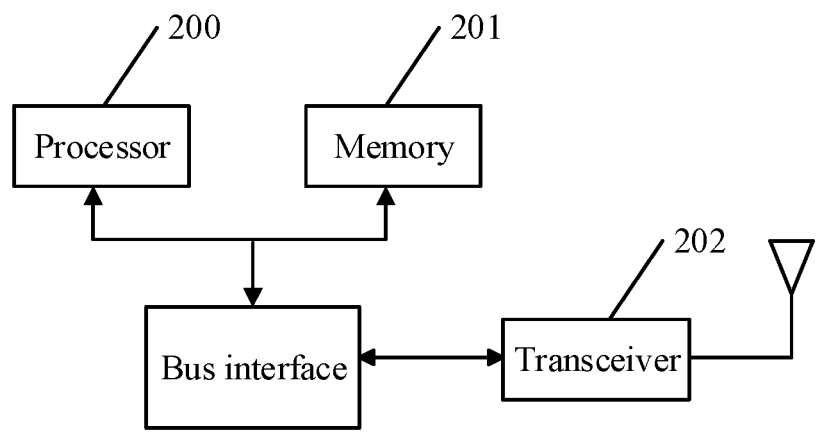
FIG. 2 is a structural diagram of a terminal provided by an embodiment of the present application.

As shown in FIG. 2, a first terminal according to an embodiment of the present application includes: a processor 200, a memory 201 and a transceiver 202.

The processor 200 is responsible for managing a bus architecture and general processing, and the memory 201 may store data used when the processor 200 executes operations. The transceiver 202 is configured to receive and send data under the control of the processor 200.

The bus architecture may include interconnected buses of any quantity and bridges of any quantity, which are specifically linked together through various circuits of one or more processors represented by the processor 200 and various circuits of memories represented by the memory 201. The bus architecture may also link various other circuits such as peripheral devices, voltage regulators, and power management circuits, which are well known in the art, and therefore are not further described herein. A bus interface provides an interface. The processor 200 is responsible for managing the bus architecture and general processing, and the memory 201 may store data used when the processor 200 executes operations.

A process disclosed in the embodiment of the present application may be applied to the processor 200 or implemented by the processor 200. During an implementation process, all steps of a signal processing flow may be completed by an integrated logic circuit of hardware or an instruction in the form of software in the processor 200. The processor 200 may be a general-purpose processor, a digital signal processor, an application specific integrated circuit, a field programmable gate array or other programmable logic devices, a discrete gate or a transistor logic device, or a discrete hardware component, and may implement or execute all methods, steps and logic block diagrams disclosed in the embodiments of the present application. The general-purpose processor may be a microprocessor, or any conventional processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 201, and the processor 200 reads information in the memory 201, and completes the steps of the signal processing flow in combination with its hardware.

The processor 200 is configured to read a program in the memory 201 and execute a following process: sending reference information to a network side device according to configuration of the network side device, the reference information including power backoff information and/or reference signal received power, and the reference signal received power being obtained on the basis of the power backoff information; and receiving a target beam indication sent by the network side device, and sending or receiving a signal on the basis of a target beam in the target beam indication, the target beam indication being determined by the network side device on the basis of the reference information.

In a possible implementation, the configuration of the network side device includes panel configuration information sent by the network side device.

The processor 200 is further configured to: before the reference information is sent to the network side device, determine a manner of receiving CSI-RS resources and/or a panel for receiving the CSI-RS resources on the basis of the panel configuration information; or, the processor 200 is further configured to: before the reference information is sent to the network side device, send the quantity of panels of the terminal and/or panel identification information to the network side device.

In a possible implementation, if the reference information includes the power backoff information, the sent power backoff information includes: a power backoff value corresponding to each L1-RSRP or each CRI sent by the terminal to the network side device, or, the sent power backoff information includes: a non-zero power backoff value in a power backoff value corresponding to each L1-RSRP or each CRI sent by the terminal to the network side device, or, the sent power backoff information includes: a power backoff value of each panel of the terminal.

In a possible implementation, the power backoff information is determined on the basis of maximum permissible exposure MPE and/or maximum sending power of the terminal.

In a possible implementation, in a case that the reference information includes the reference signal received power, the configuration of the network side device includes: signaling indicating the terminal to report the reference signal received power sent by the network side device.

In a possible implementation, the processor 200 may be configured to: adjust, by the terminal, the corresponding L1-RSRP on the basis of the power backoff information to obtain the reference signal received power.

In a possible implementation, the panel configuration information includes at least one of following information: a panel identifier, a quantity of panels or whether a single panel is adopted.

An embodiment of the present application further provides another terminal, including: a processor, a memory and a transceiver.

The processor is configured to read a program in the memory and execute a following process: determining a manner of sending SRS resources and/or a panel for sending the SRS resources according to panel configuration information sent by a network side device; sending the SRS resources to the network side device through sending power obtained according to power backoff on the basis of the determined sending manner and/or panel; and receiving a target beam indication sent by the network side device, and sending or receiving a signal on the basis of a target beam in the target beam indication, the target beam indication being determined by the network side device on the basis of received power for receiving all the SRS resources.

In a possible implementation, the panel configuration information includes at least one of following information: a panel identifier, a quantity of panels, whether a single panel is adopted or at least one SRS resource set.

In a possible implementation, each SRS resource set is associated with one panel of the terminal.

Figure 3:
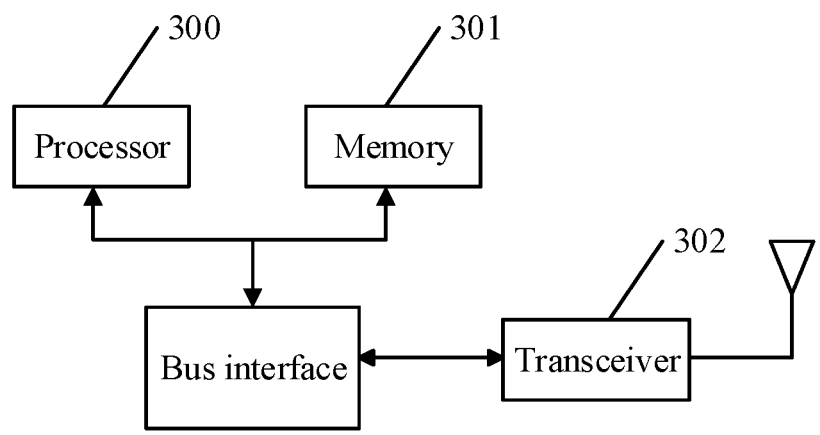
FIG. 3 is a structural diagram of a network side device provided by an embodiment of the present application.

As shown in FIG. 3, a network side device according to an embodiment of the present application includes: a processor 300, a memory 301 and a transceiver 302.

The processor 300 is responsible for managing the bus architecture and general processing, and the memory 301 may store data used when the processor 300 executes operations. The transceiver 302 is configured to receive and send data under the control of the processor 300.

The bus architecture may include interconnected buses of any quantity and bridges of any quantity, which are specifically linked together through various circuits of one or more processors represented by the processor 300 and various circuits of memories represented by the memory 301. The bus architecture may also link various other circuits such as peripheral devices, voltage regulators, and power management circuits, which are well known in the art, and therefore are not further described herein. A bus interface provides an interface. The processor 300 is responsible for managing the bus architecture and general processing, and the memory 301 may store data used when the processor 300 executes operations.

A process disclosed in the embodiment of the present application may be applied to the processor 300 or implemented by the processor 300. During an implementation process, all steps of a signal processing flow may be completed by an integrated logic circuit of hardware or an instruction in the form of software in the processor 300. The processor 300 may be a general-purpose processor, a digital signal processor, an application specific integrated circuit, a field programmable gate array or other programmable logic devices, a discrete gate or a transistor logic device, or a discrete hardware component, and may implement or execute all methods, steps and logic block diagrams disclosed in the embodiments of the present application. The general-purpose processor may be a microprocessor, or any conventional processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 301, and the processor 300 reads information in the memory 301, and completes the steps of the signal processing flow in combination with its hardware.

The processor 300 is configured to read a program in the memory 301 and execute a following process: configuring a terminal to send reference information, and determining a target beam indication on the basis of the received reference information sent by the terminal, the reference information including power backoff information and/or reference signal received power, and the reference signal received power being obtained on the basis of the power backoff information; and sending the target beam indication to the terminal to cause the terminal to send or receive a signal on the basis of a target beam in the target beam indication.

In a possible implementation, the processor 300 may be configured to: send panel configuration information to the terminal to cause the terminal to determine a manner of receiving CSI-RS resources and/or a panel for receiving the CSI-RS resources on the basis of the panel configuration information, or, configure the terminal to send the quantity of panels of the terminal and/or panel identification information.

In a possible implementation, in a case that the reference information includes the power backoff information, the sent power backoff information includes: a power backoff value corresponding to each L1-RSRP or each CRI sent by the terminal to the network side device, or, the sent power backoff information includes: a non-zero power backoff value in a power backoff value corresponding to each L1-RSRP or each CRI sent by the terminal to the network side device, or, the sent power backoff information includes: a power backoff value of each panel of the terminal.

In a possible implementation, the power backoff information is determined on the basis of MPE and/or maximum sending power of the terminal.

In a possible implementation, in a case that the reference information includes the reference signal received power, the processor 300 may be configured to: send signaling indicating the terminal to report the reference signal received power to the terminal.

In a possible implementation, the reference signal received power is obtained by adjusting the L1-RSRP by the terminal on the basis of the power backoff information.

In a possible implementation, the panel configuration information includes at least one of following information: a panel identifier, a quantity of panels or whether a single panel is adopted.

An embodiment of the present application further provides another network side device, including: a processor, a memory and a transceiver.

The processor is configured to read a program in the memory and execute a following process: sending panel configuration information to a terminal to cause the terminal to send SRS resources through sending power obtained according to power backoff on the basis of a manner of sending the SRS resources and/or a panel for sending the SRS resources in the panel configuration information; and determining a target beam indication according to received power of all the SRS resources, and sending the target beam indication to the terminal to cause the terminal to send or receive a signal on the basis of a target beam in the target beam indication.

In a possible implementation, the panel configuration information includes at least one of following information: a panel identifier, a quantity of panels, whether a single panel is adopted or at least one SRS resource set.

In a possible implementation, each SRS resource set is associated with one panel of the terminal.

Figure 4:
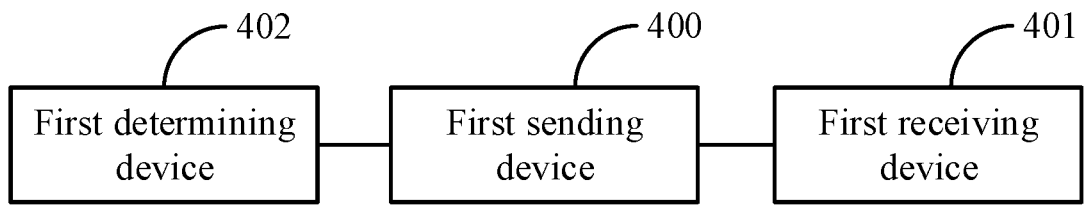
FIG. 4 is a structural diagram of a beam determination apparatus provided by an embodiment of the present application.

As shown in FIG. 4, a beam determination apparatus provided by an embodiment of the present application includes: a first sending device 400 and a first receiving device 401, may further including a first determining device 402.

The first sending device 400 is configured to send reference information to a network side device according to configuration of the network side device, the reference information including power backoff information and/or reference signal received power, and the reference signal received power being obtained on the basis of the power backoff information.

The first receiving device 401 is configured to receive a target beam indication sent by the network side device, and send or receive a signal on the basis of a target beam in the target beam indication, the target beam indication being determined by the network side device on the basis of the reference information.

The configuration of the network side device includes panel configuration information sent by the network side device.

The first determining device 402 is configured to determine a manner of receiving CSI-RS resources and/or a panel for receiving the CSI-RS resources on the basis of the panel configuration information before the first sending device 400 sends the reference information to the network side device.

The first sending device 400 is further configured to send the quantity of panels of the terminal and/or panel identification information to the network side device before the reference information is sent to the network side device.

In a possible implementation, if the reference information includes the power backoff information, the sent power backoff information includes: a power backoff value corresponding to each L1-RSRP or each CRI sent by the terminal to the network side device, or, the sent power backoff information includes: a non-zero power backoff value in a power backoff value corresponding to each L1-RSRP or each CRI sent by the terminal to the network side device, or, the sent power backoff information includes: a power backoff value of each panel of the terminal.

In a possible implementation, the power backoff information is determined on the basis of maximum permissible exposure MPE and/or maximum sending power of the terminal.

In a possible implementation, in a case that the reference information includes the reference signal received power, the configuration of the network side device includes: signaling indicating the terminal to report the reference signal received power sent by the network side device.

In a possible implementation, the first sending device 400 may be configured to: adjust, by the terminal, the corresponding L1-RSRP on the basis of the power backoff information to obtain the reference signal received power.

In a possible implementation, the panel configuration information includes at least one of following information: a panel identifier, a quantity of panels or whether a single panel is adopted.

Figure 5:
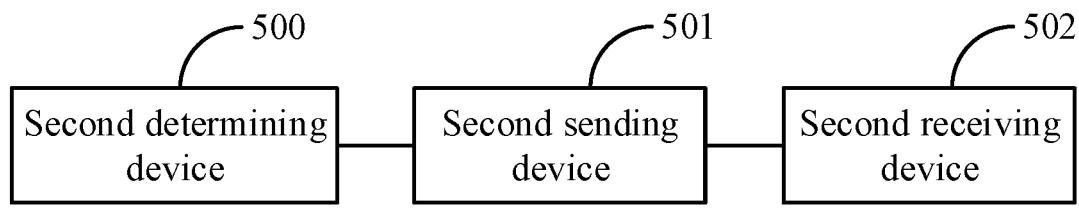
FIG. 5 is a structural diagram of another beam determination apparatus provided by an embodiment of the present application.

As shown in FIG. 5, another beam determination apparatus provided by an embodiment of the present application includes: a second determining device 500, a second sending device 501 and a second receiving device 502.

The second determining device 500 is configured to determine a manner of sending SRS resources and/or a panel for sending the SRS resources according to panel configuration information sent by a network side device.

The second sending device 501 is configured to send the SRS resources to the network side device through sending power obtained according to power backoff on the basis of the determined sending manner and/or panel.

The second receiving device 502 is configured to receive a target beam indication sent by the network side device, and send or receive a signal on the basis of a target beam in the target beam indication, the target beam indication being determined by the network side device on the basis of received power for receiving all the SRS resources.

In a possible implementation, the panel configuration information includes at least one of following information: a panel identifier, a quantity of panels, whether a single panel is adopted or at least one SRS resource set.

In a possible implementation, each SRS resource set is associated with one panel of the terminal.

Figure 6:
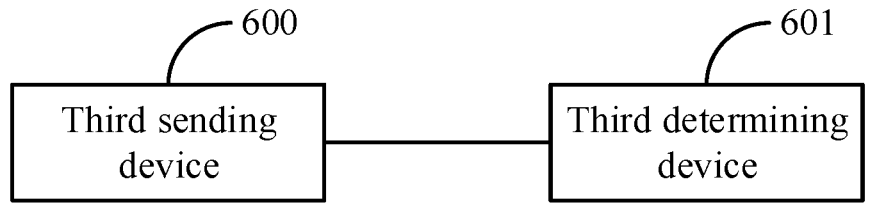
FIG. 6 is a structural diagram of yet another beam determination apparatus provided by an embodiment of the present application.

As shown in FIG. 6, yet another beam determination apparatus provided by an embodiment of the present application includes: a third sending device 600 and a third determining device 601.

The third sending device 600 is configured to configure a terminal to send reference information.

The third determining device 601 is configured to determine a target beam indication on the basis of the received reference information sent by the terminal, the reference information including power backoff information and/or reference signal received power, and the reference signal received power being obtained on the basis of the power backoff information.

The third sending device 600 is further configured to send the target beam indication to the terminal to cause the terminal to send or receive a signal on the basis of a target beam.

In a possible implementation, the third sending device 600 may be configured to: send panel configuration information to the terminal to cause the terminal to determine a manner of receiving CSI-RS resources and/or a panel for receiving the CSI-RS resources on the basis of the panel configuration information, or, configure the terminal to send the quantity of panels of the terminal and/or panel identification information.

In a possible implementation, in a case that the reference information includes the power backoff information, the sent power backoff information includes: a power backoff value corresponding to each L1-RSRP or each CRI sent by the terminal to the network side device, or, the sent power backoff information includes: a non-zero power backoff value in a power backoff value corresponding to each L1-RSRP or each CRI sent by the terminal to the network side device, or, the sent power backoff information includes: a power backoff value of each panel of the terminal.

In a possible implementation, the power backoff information is determined on the basis of MPE and/or maximum sending power of the terminal.

In a possible implementation, in a case that the reference information includes the reference signal received power, the third sending device 600 may be configured to: send signaling indicating the terminal to report the reference signal received power to the terminal.

In a possible implementation, the reference signal received power is obtained by adjusting the L1-RSRP by the terminal on the basis of the power backoff information.

In a possible implementation, the panel configuration information includes at least one of following information: a panel identifier, a quantity of panels or whether a single panel is adopted.

Figure 7:
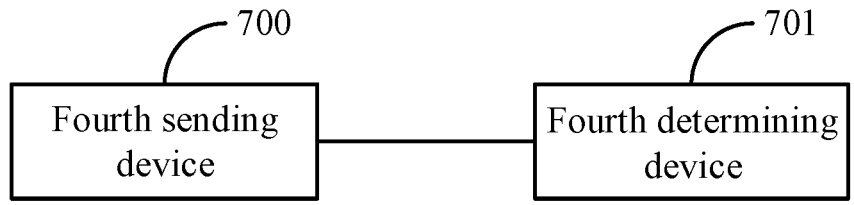
FIG. 7 is a structural diagram of yet another beam determination apparatus provided by an embodiment of the present application.

As shown in FIG. 7, yet another beam determination apparatus provided by an embodiment of the present application includes: a fourth sending device 700 and a fourth determining device 701.

The fourth sending device 700 is configured to send panel configuration information to a terminal to cause the terminal to send SRS resources through sending power obtained according to power backoff on the basis of a manner of sending the SRS resources and/or a panel for sending the SRS resources in the panel configuration information.

The fourth determining device 701 is configured to determine a target beam indication according to received power of all the SRS resources.

The fourth sending device 700 is further configured to send the target beam indication to the terminal to cause the terminal to send or receive a signal on the basis of a target beam in the target beam indication.

In a possible implementation, the panel configuration information includes at least one of following information: a panel identifier, a quantity of panels, whether a single panel is adopted or at least one SRS resource set.

In a possible implementation, each SRS resource set is associated with one panel of the terminal.

An embodiment of the present application provides a readable storage medium. The readable storage medium is a non-volatile storage medium. The readable storage medium is a non-volatile readable storage medium, including a program code, and the program code, when operating on a computing device, is configured to cause the computing device to execute the above solution of performing beam determination by a network side device.

An embodiment of the present application provides a readable storage medium. The readable storage medium is a non-volatile storage medium. The readable storage medium is a non-volatile readable storage medium, including a program code, and the program code, when operating on a computing device, is configured to cause the computing device to execute the above solution of performing beam determination by a terminal.

An embodiment of the present application provides a computer program product including instructions. The instructions, when operating on a computer, cause the computer to execute the solution of performing beam determination by a network side device.

An embodiment of the present application provides a computer program product including instructions. The instructions, when operating on a computer, cause the computer to execute the solution of performing beam determination by a terminal.

One embodiment of the present application further provides a beam determination method. Since a device corresponding to the method is a terminal in the beam determination system according to the embodiment of the present application, and a principle for solving problems of the method is similar to that of the device, implementation of this method may be referred to implementation of the system, for which, repetition is omitted here.

Figure 8:
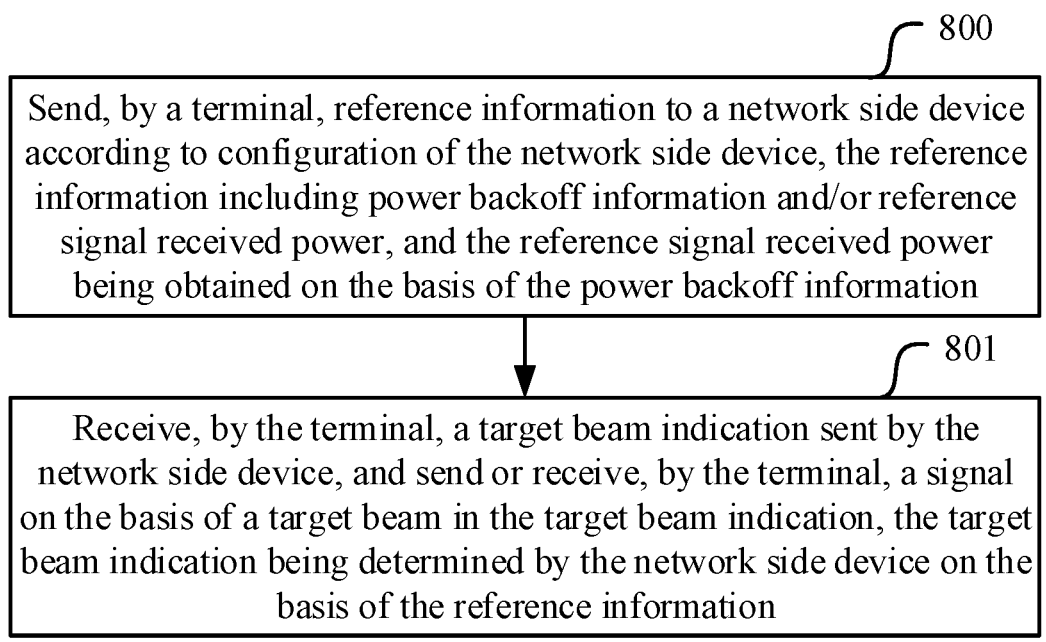
FIG. 8 is a flow diagram of a beam determination method provided by an embodiment of the present application.

As shown in FIG. 8, it is a flow diagram of a beam determination method provided by an embodiment of the present application, and the method includes the following steps.

S800, a terminal sends reference information to a network side device according to configuration of the network side device, the reference information including power backoff information and/or reference signal received power, and the reference signal received power being obtained on the basis of the power backoff information.

S801, the terminal receives a target beam indication sent by the network side device, and sends or receives a signal on the basis of a target beam in the target beam indication, the target beam indication being determined by the network side device on the basis of the reference information.

In a possible implementation, the configuration of the network side device includes panel configuration information sent by the network side device.

Before the terminal sends the reference information to the network side device, the method further includes: the terminal determines a manner of receiving CSI-RS resources and/or a panel for receiving the CSI-RS resources on the basis of the panel configuration information, or, the terminal sends a quantity of panels of the terminal and/or panel identification information to the network side device.

In a possible implementation, in a case that the reference information includes the power backoff information, the sent power backoff information includes: a power backoff value corresponding to each L1-RSRP or each CRI sent by the terminal to the network side device, or, the sent power backoff information includes: a non-zero power backoff value in a power backoff value corresponding to each L1-RSRP or each CRI sent by the terminal to the network side device, or, the sent power backoff information includes: a power backoff value of each panel of the terminal.

In a possible implementation, the power backoff information is determined on the basis of maximum permissible exposure MPE and/or maximum sending power of the terminal.

In a possible implementation, in a case that the reference information includes the reference signal received power, the configuration of the network side device includes: signaling indicating the terminal to report the reference signal received power sent by the network side device.

In a possible implementation, the terminal determines the reference signal received power through a following manner: adjusting, by the terminal, the corresponding L1-RSRP on the basis of the power backoff information to obtain the reference signal received power.

In a possible implementation, the panel configuration information includes at least one of following information: a panel identifier, a quantity of panels or whether a single panel is adopted.

One embodiment of the present application further provides a beam determination method. Since a device corresponding to the method is a terminal in the beam determination system according to the embodiment of the present application, and a principle for solving problems of the method is similar to that of the device, implementation of this method may be referred to implementation of the system, for which, repetition is omitted here.

Figure 9:
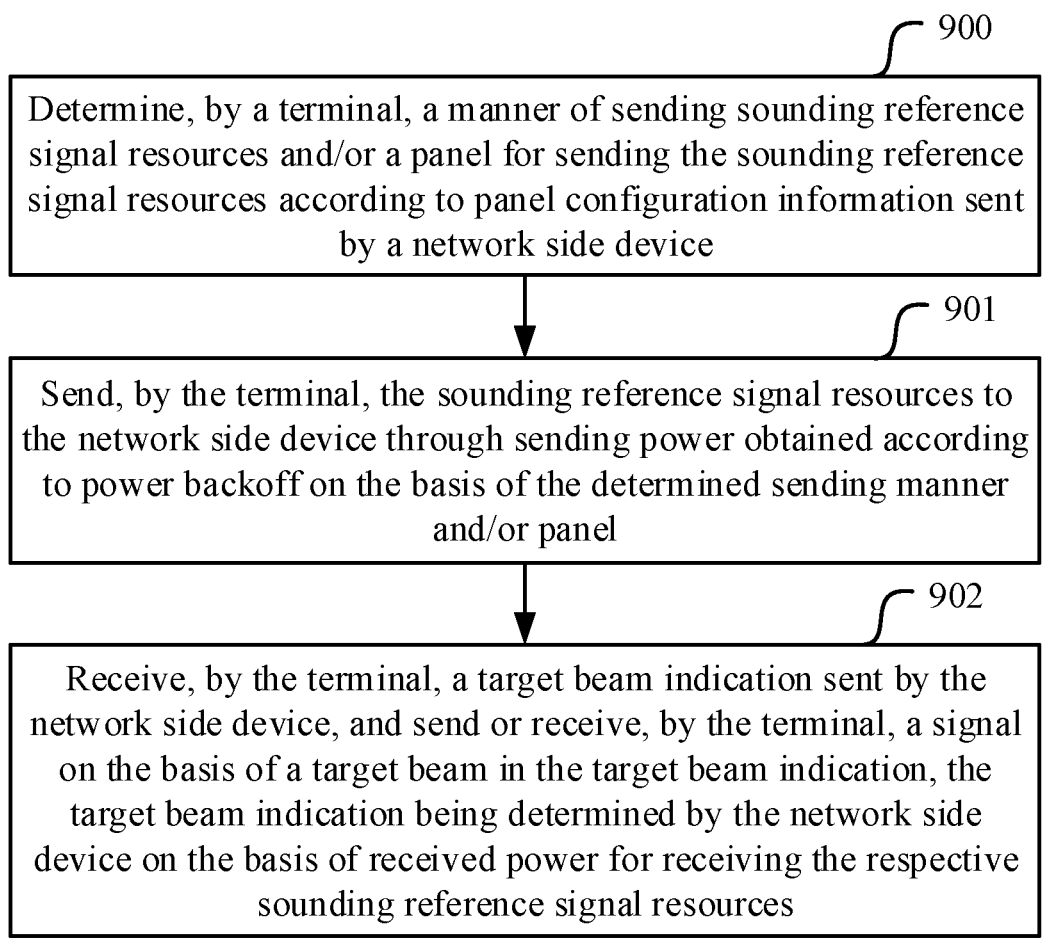
FIG. 9 is a flow diagram of another beam determination method provided by an embodiment of the present application.

As shown in FIG. 9, it is a flow diagram of another beam determination method provided by an embodiment of the present application, and the method includes the following steps.

S900, the terminal determines a manner of sending SRS resources and/or a panel for sending the SRS resources according to panel configuration information sent by a network side device.

S901, the terminal sends the SRS resources to the network side device through sending power obtained according to power backoff on the basis of the determined sending manner and/or panel.

S902, the terminal receives a target beam indication sent by the network side device, and sends or receives a signal on the basis of a target beam in the target beam indication, the target beam indication being determined by the network side device on the basis of received power for receiving all the SRS resources.

In a possible implementation, the panel configuration information includes at least one of following information: a panel identifier, a quantity of panels, whether a single panel is adopted or at least one SRS resource set.

In a possible implementation, each SRS resource set is associated with one panel of the terminal.

One embodiment of the present application further provides a beam determination method. Since a device corresponding to the method is a network side device in the beam determination system according to the embodiment of the present application, and a principle for solving problems of the method is similar to that of the device, implementation of this method may be referred to implementation of the system, for which, repetition is omitted here.

Figure 10:
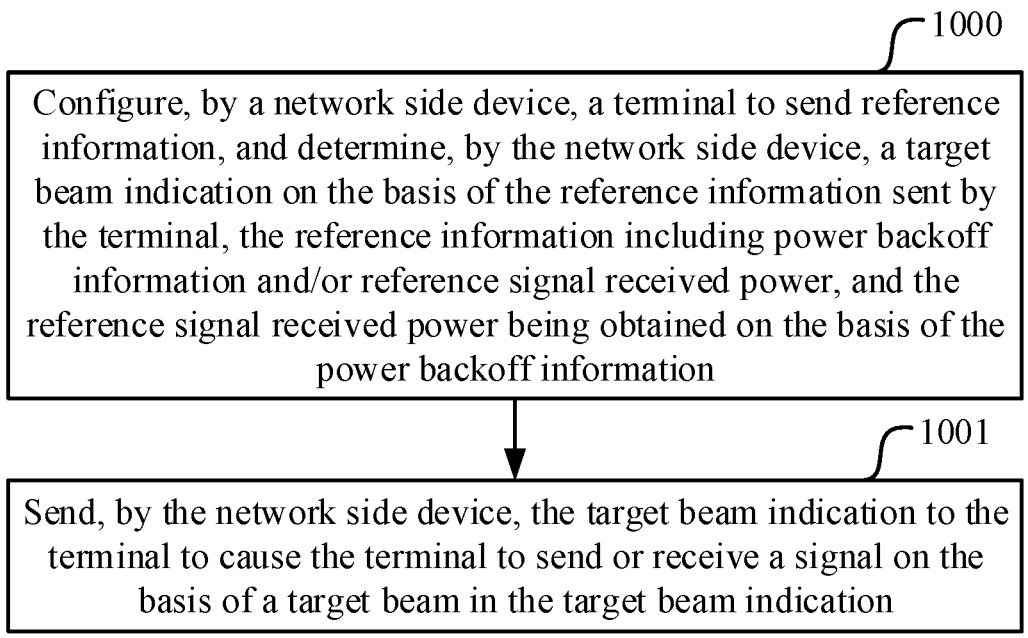
FIG. 10 is a flow diagram of yet another beam determination method provided by an embodiment of the present application.

As shown in FIG. 10, it is a flow diagram of yet another beam determination method provided by an embodiment of the present application, and the method includes the following steps.

S1000, a network side device configures a terminal to send reference information, and determines a target beam indication on the basis of the received reference information sent by the terminal, the reference information including power backoff information and/or reference signal received power, and the reference signal received power being obtained on the basis of the power backoff information.

S1001, the network side device sends the target beam indication to the terminal to cause the terminal to send or receive a signal on the basis of a target beam in the target beam indication.

In a possible implementation, the network side device configuring the terminal to send the reference information includes: the network side device sends panel configuration information to the terminal to cause the terminal to determine a manner of receiving CSI-RS resources and/or a panel for receiving the CSI-RS resources on the basis of the panel configuration information; or the network side device configures the terminal to send a quantity of panels of the terminal and/or panel identification information.

In a possible implementation, if the reference information includes the power backoff information, the sent power backoff information includes: a power backoff value corresponding to each L1-RSRP or each CRI sent by the terminal to the network side device, or, the sent power backoff information includes: a non-zero power backoff value in a power backoff value corresponding to each L1-RSRP or each CRI sent by the terminal to the network side device, or, the sent power backoff information includes: a power backoff value of each panel of the terminal.

In a possible implementation, the power backoff information is determined on the basis of MPE and/or maximum sending power of the terminal.

In a possible implementation, in a case that the reference information includes the reference signal received power, the configuring, by network side device, the terminal to send the reference information includes: signaling indicating the terminal to report the reference signal received power sent by the network side device to the terminal.

In a possible implementation, the reference signal received power is obtained by adjusting the L1-RSRP by the terminal on the basis of the power backoff information.

In a possible implementation, the panel configuration information includes at least one of following information: a panel identifier, a quantity of panels or whether a single panel is adopted.

One embodiment of the present application further provides a beam determination method. Since a device corresponding to the method is a network side device in the beam determination system according to the embodiment of the present application, and a principle for solving problems of the method is similar to that of the device, implementation of this method may be referred to implementation of the system, for which, repetition is omitted here.

Figure 11:
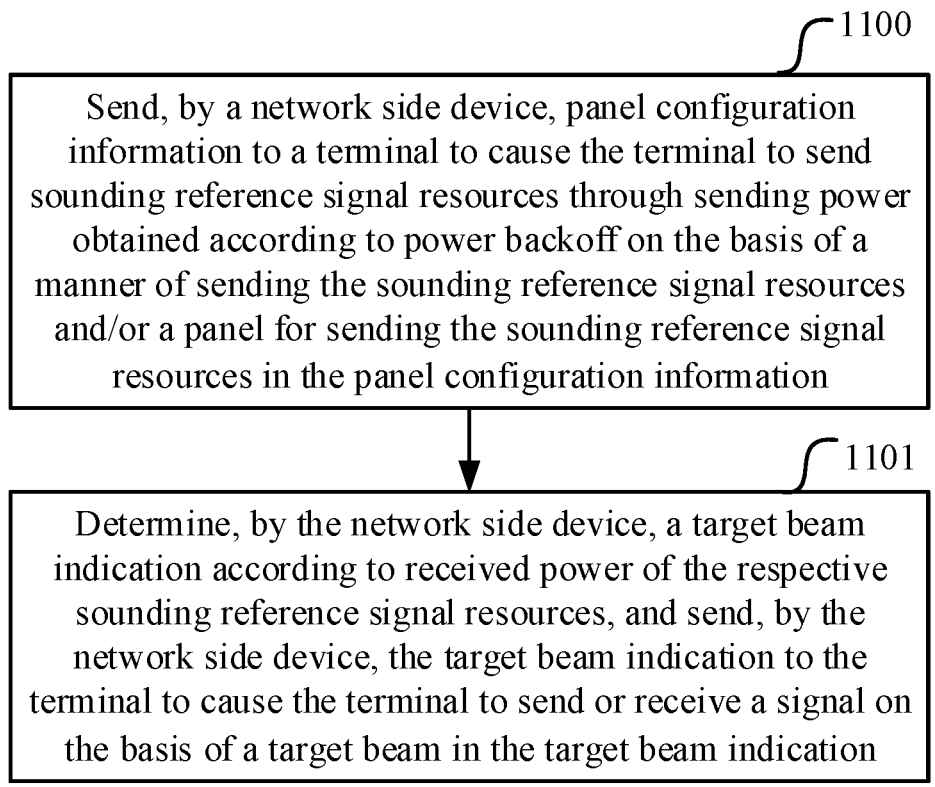
FIG. 11 is a flow diagram of yet another beam determination method provided by an embodiment of the present application.

As shown in FIG. 11, it is a flow diagram of yet another beam determination method provided by an embodiment of the present application, and the method includes the following steps.

S1100, a network side device sends panel configuration information to a terminal to cause the terminal to send SRS resources through sending power obtained according to power backoff on the basis of a manner of sending the SRS resources and/or a panel for sending the SRS resources in the panel configuration information.

S1101, the network side device determines a target beam indication according to received power of all the SRS resources, and sends the target beam indication to the terminal to cause the terminal to send or receive a signal on the basis of a target beam in the target beam indication.

In a possible implementation, the panel configuration information includes at least one of following information: a panel identifier, a quantity of panels, whether a single panel is adopted or at least one SRS resource set.

In a possible implementation, each SRS resource set is associated with one panel of the terminal.

The present application is described above with reference to block diagrams and/or flow diagrams of methods, apparatuses (systems) and/or computer program products according to the embodiments of the present application. It should be understood that a block of the block diagrams and/or the flow diagrams and a combination of blocks of the block diagrams and/or the flow diagrams can be implemented by computer program instructions. These computer program instructions may be provided for a processor of a general-purpose computer and a special-purpose computer and/or other programmable data processing apparatuses to produce a machine, and instructions executed by the processor of the computer and/or other programmable data processing apparatuses create a method for implementing a function/action specified in blocks of the block diagrams and/or the flow diagrams.

Correspondingly, the present application may be further implemented through hardware and/or software (including firmware, resident software, microcodes, etc.). Further, the present application may take the form of a computer program product on a computer usable or computer readable storage medium having computer usable or computer readable program codes implemented in the medium for use by or in combination with an instruction execution system. In the context of the present application, a computer usable or computer-readable medium may be any medium that may contain, store, communicate, transmit, or convey a program for use by, or in combination with, an instruction execution system, apparatus, or device.

What is claimed is:

1. A beam determination method, comprising:
    sending, by a terminal, reference information to a network side device according to configuration of the network side device, wherein the reference information comprises power backoff information and/or reference signal received power, and the reference signal received power is obtained on the basis of the power backoff information; and
    receiving, by the terminal, a target beam indication sent by the network side device, and sending or receiving, by the terminal, a signal on the basis of a target beam in the target beam indication, wherein the target beam indication is determined by the network side device on the basis of the reference information;
    wherein in a case that the reference information comprises the power backoff information, the sent power backoff information comprises: a power backoff value corresponding to each layer 1 reference signal received power (L1-RSRP) or each channel state information reference signal resource indicator (CRI) sent by the terminal to the network side device, or, the sent power backoff information comprises: a non-zero power backoff value corresponding to each L1-RSRP or each CRI sent by the terminal to the network side device, or, the sent power backoff information comprises: a power backoff value of each panel of the terminal.

2. The method according to claim 1, wherein the configuration of the network side device comprises panel configuration information sent by the network side device, and before the sending, by the terminal, the reference information to the network side device, the method further comprises:

determining, by the terminal, a manner of receiving channel state information reference signal, CSI-RS, resources and/or a panel for receiving CSI-RS resources on the basis of the panel configuration information, or, sending, by the terminal, a quantity of panels of the terminal and/or panel identification information to the network side device.

3. The method according to claim 1, wherein the power backoff information is determined on the basis of maximum permissible exposure MPE and/or maximum sending power of the terminal.

4. The method according to claim 1, wherein the reference signal received power is determined by the terminal through a following manner:

obtaining, by the terminal, the reference signal received power by adjusting a corresponding L1-RSRP on the basis of the power backoff information.

5. The method according to claim 2, wherein the panel configuration information comprises at least one of following information: a panel identifier, a quantity of panels or whether a single panel is adopted.

6. A beam determination method, comprising:

configuring, by a network side device, a terminal to send reference information, and determining, by the network side device, a target beam indication on the basis of the reference information sent by the terminal, wherein the reference information comprises power backoff information and/or reference signal received power, and the reference signal received power is obtained on the basis of the power backoff information; and sending, by the network side device, the target beam indication to the terminal, wherein a target beam in the target beam indication is configured for sending or receiving a signal;

wherein in a case that the reference information comprises the power backoff information, the sent power backoff information comprises: a power backoff value corresponding to each layer 1 reference signal received power (L1-RSRP) or each channel state information reference signal resource indicator (CRI) sent by the terminal to the network side device, or, the sent power backoff information comprises: a non-zero power backoff value corresponding to each L1-RSRP or each CRI sent by the terminal to the network side device, or, the sent power backoff information comprises: a power backoff value of each panel of the terminal.

7. The method according to claim 6, wherein the configuring, by the network side device, the terminal to send the reference information comprises:

sending, by the network side device, panel configuration information to the terminal, wherein the panel configuration information is configured to determine a manner of receiving CSI-RS resources and/or a panel for receiving CSI-RS resources, or, configuring, by the network side device, the terminal to send a quantity of panels of the terminal and/or panel identification information.

8. The method according to claim 6, wherein the power backoff information is determined on the basis of MPE and/or maximum sending power of the terminal.

9. The method according to claim 6, wherein in a case that the reference information comprises the reference signal received power, the configuring, by the network side device, the terminal to send the reference information comprises: signaling indicating the terminal to report the reference signal received power sent by the network side device to the terminal.

10. The method according to claim 6, wherein the reference signal received power is obtained by adjusting the L1-RSRP by the terminal on the basis of the power backoff information.

11. The method according to claim 7, wherein the panel configuration information comprises at least one of following information: a panel identifier, a quantity of panels or whether a single panel is adopted.

12. A network side device, comprising: a processor, a memory and a transceiver; wherein the processor is configured to read programs in the memory and execute the method of claim 10.

13. The network side device according to claim 12, wherein the processor is further configured to:

send panel configuration information to the terminal, wherein the panel configuration information is configured to determine a manner of receiving CSI-RS resources and/or a panel for receiving CSI-RS resources, or, configure the terminal to send a quantity of panels of the terminal and/or panel identification information.

14. A terminal, comprising: a processor, a memory and a transceiver; wherein the processor is configured to read programs in the memory and execute following processes:

sending reference information to a network side device according to configuration of the network side device, wherein the reference information comprises power backoff information and/or reference signal received power, and the reference signal received power is obtained on the basis of the power backoff information; and receiving a target beam indication sent by the network side device, and sending or receiving a signal on the basis of a target beam in the target beam indication, wherein the target beam indication is determined by the network side device on the basis of the reference information;

wherein in a case that the reference information comprises the power backoff information, the sent power backoff information comprises: a power backoff value corresponding to each layer 1 reference signal received power (L1-RSRP) or each channel state information reference signal resource indicator (CRI) sent by the terminal to the network side device, or, the sent power backoff information comprises: a non-zero power backoff value corresponding to each L1-RSRP or each CRI sent by the terminal to the network side device, or, the sent power backoff information comprises: a power backoff value of each panel of the terminal.

15. The terminal according to claim 14, wherein the configuration of the network side device comprises panel configuration information sent by the network side device, and the processor is further configured to: before the reference information is sent to the network side device, determine a manner of receiving CSI-RS resources and/or a panel for receiving CSI-RS resources on the basis of the panel configuration information, or, the processor is further configured to: before the reference information is sent to the network side device, send a quantity of panels of the terminal and/or panel identification information to the network side device.

16. The terminal according to claim 14, wherein the power backoff information is determined on the basis of MPE and/or maximum sending power of the terminal.

* * * * *